(12) United States Patent
Udupa et al.

(10) Patent No.: US 8,543,598 B2
(45) Date of Patent: Sep. 24, 2013

(54) SEMANTIC OBJECT CHARACTERIZATION AND SEARCH

(75) Inventors: Uppinakuduru Raghavendra Udupa, Bangalore (IN); Shaishav Kumar, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 458 days.

(21) Appl. No.: 12/715,174

(22) Filed: Mar. 1, 2010

(65) Prior Publication Data

US 2011/0213784 A1    Sep. 1, 2011

(51) Int. Cl.
*G06F 7/00* (2006.01)
*G06F 17/30* (2006.01)

(52) U.S. Cl.
USPC .......................................... 707/780; 707/747

(58) Field of Classification Search
USPC ................................. 707/780, 999.005, 747
See application file for complete search history.

(56) References Cited

U.S. PATENT DOCUMENTS

| | | | |
|---|---|---|---|
| 6,002,997 A | 12/1999 | Tou | |
| 6,006,221 A | 12/1999 | Liddy | |
| 6,154,747 A * | 11/2000 | Hunt | 707/999.002 |
| 6,226,640 B1 * | 5/2001 | Ostrovsky et al. | 707/999.005 |
| 6,311,183 B1 | 10/2001 | Cohen | |
| 6,360,196 B1 | 3/2002 | Poznanski | |
| 6,654,717 B2 | 11/2003 | Loofbourrow | |
| 6,701,014 B1 | 3/2004 | Syeda-Mahmood | |
| 6,999,916 B2 | 2/2006 | Lin | |
| 2005/0216253 A1 * | 9/2005 | Brockett | 704/5 |
| 2006/0173886 A1 | 8/2006 | Moulinier et al. | |
| 2007/0185868 A1 * | 8/2007 | Roth et al. | 707/999.006 |
| 2008/0059512 A1 * | 3/2008 | Roitblat et al. | 707/999.102 |
| 2008/0114564 A1 * | 5/2008 | Ihara | 702/158 |
| 2008/0147215 A1 * | 6/2008 | Kim et al. | 700/94 |
| 2009/0193003 A1 | 7/2009 | Heymans et al. | |
| 2009/0222437 A1 | 9/2009 | Niu et al. | |

FOREIGN PATENT DOCUMENTS

| | | |
|---|---|---|
| KR | 10-2009-0024460 A | 3/2009 |
| KR | 10-2010-003178 A | 1/2010 |
| WO | 2009120880 A2 | 10/2009 |

OTHER PUBLICATIONS

Jonathan D. Cohen, Hardware-Based Algorithm for Full-Text Large-Dictionary String Matching Using N-Gram Hashing, 1998, retrieved Apr. 14, 2012 from http://ac.els-cdn.com/S0306457398000119/1-s2.0-S0306457398000119-main.pdf?_tid=8391ee 1b98f3abd704 a0d082b79624b0&acdnat=1334692291_c4ade7fb31f7 eedbae 717e5dd0f34d7e.*

(Continued)

*Primary Examiner* — Etienne Leroux
*Assistant Examiner* — Bryan Walker
(74) *Attorney, Agent, or Firm* — Lyon & Harr, LLP; Richard T. Lyon (57) ABSTRACT

Semantic object characterization and its use in indexing and searching a database directory is presented. In general, a first binary hash code is generated to represent a first representation or view of a semantic object which when compared to a characterized version of a second representation or view of the same semantic object in the form of a second binary hash code, the first and second binary hash codes exhibit a degree of similarity indicative of the objects being the same object. In one implementation the semantic objects correspond to peoples' names and the first and second representations or views correspond to two different languages. Thus, a user can search a database of information in one language with a search query in another language.

20 Claims, 8 Drawing Sheets

(56) References Cited

OTHER PUBLICATIONS

Yin Zhang & Zhi-Hua Zhou, "Multi-Label Dimensionality Reduction via Dependence Maximization", Association for the Advancement of Artificial Intelligence, 2008, retrieved Apr. 15, 2012 from http://www.aaai.org/Papers/AAAI/2008/AAAI08-249.pdf.*

Li et al., "Semantic Transliteration of Personal Names", Proceedings of the 45th Annual Meeting of the Association of Computational Linguistics, pp. 120-127, Prague, Czech Republic, Jun. 2007. Retrieved on Aug. 14, 2012 from http://www.aclweb.org/anthology-new/W/W12/W12-4404.pdf.*

Steinberger, R., B. Pouliquen, C. Ignat, Exploiting multilingual nomenclatures and language-independent text features as an interlingua for cross-lingual text analysis applications, Computer Research Repository, Sep. 2006.

Wang, Y.J., Coenen, F., Leng, P., Sanderson, R., Text classification using language-independent pre-processing, Proc. of the Twenty-Sixth SGAI Int'l Conf. on Innovative Techniques and Applications of Artificial Intelligence, Dec. 2006, pp. 413-417, Springer, Heidelberg, Peterhouse College, Cambridge, UK.

Manmatha, R., T. M. Rath, F. Feng, Modeling score distributions for combining the outputs of search engines, Proc. of the 24th Annual Int'l ACM SIGIR Conf. on Research and Development in Info. Retrieval, pp. 267-275, Sep. 2001, New Orleans, Louisiana, USA.

\* cited by examiner

SEMANTIC OBJECT CHARACTERIZATION AND SEARCH

BACKGROUND

Search engines are in the most general terms, software programs that index information contained in one or more databases. This indexed information is often stored in a directory of the database. A search engine then allows a user to input a search query whose terms are employed to find relevant information in the databases via the directory. The relevant information found is reported to the user.

The type of information indexed can be any imaginable. It can be web pages, documents, labeled images, and so on. Typically, the information is in a particular language and the search queries are also presented in the same language.

In addition, often the indexed informational items, which can be referred to generally as semantic objects, are characterized in the directory in a way that makes searching through the objects listed quick and efficient. In such cases, the search query is typically characterized in the same manner before being compared to the characterized directory entries.

SUMMARY

This summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

Semantic object characterization and search embodiments described herein generally involve first inputting pairs of parallel semantic objects. A pair of parallel semantic objects is defined as the same semantic object presented in first and second representations or views. For example, if the semantic objects correspond to peoples' names then a pair of parallel names can be the same name presented in two different languages, and potentially two different scripts. Each semantic object in each pair of parallel objects is subjected to feature extraction to produce a feature vector representing the semantic object. A correlation and optimization method is then employed to establish a prescribed number of transforms for the first representation or view and the same number of transforms for the second representation or view, based on the feature vectors representing the parallel semantic object pairs. In general, the transforms established for one of the first or second representations or views, when applied to a feature vector representing a semantic object exhibiting that representation or view, produces the first binary hash code representing that semantic object which is substantially similar to the second binary hash code representing that semantic object produced when the transforms established for the other of the first or second representations or views are applied to a feature vector representing the same semantic object exhibiting that other representation or view.

The transforms established for the first representation or view are used to characterize the semantic objects included in the database, which exhibit the first representation or view, in the form of the first binary hash code representing that semantic object. Next, the first binary hash codes characterizing the semantic objects included in the database are respectively associated with its corresponding semantic object in the database directory.

When a search query is input which exhibits the aforementioned second representation or view, a feature vector representing the search query is generated. Each of the transforms established for the second representation or view are applied to the search query feature vector, in turn, and the result is binarized, to produce a bit of the second binary hash code representing the search query. The bits produced by the transforms are then concatenated in a prescribed order to produce the second binary hash code representing the search query. Next, a semantic object or objects included in the database whose first binary hash code exhibits a prescribed degree of similarity to the second binary hash code representing the search query are found. The identity of the matching semantic object or objects is then output.

DESCRIPTION OF THE DRAWINGS

The specific features, aspects, and advantages of the disclosure will become better understood with regard to the following description, appended claims, and accompanying drawings where:

DETAILED DESCRIPTION

In the following description of semantic object characterization and its use in indexing and searching a database directory, reference is made to the accompanying drawings which form a part hereof, and in which are shown, by way of illustration, specific embodiments in which the characterization may be practiced. It is understood that other embodiments may be utilized and structural changes may be made without departing from the scope of the technique.

1.0 Semantic Object Characterization

In general, semantic object characterization is a computer-implemented technique that characterizes a first representation or view of a semantic object in the form of a first binary hash code such that when compared to a characterized version of a second representation or view of the same semantic object in the form of a second binary hash code, the first and second binary hash codes exhibit a degree of similarity indicative of the objects being the same object.

Figure 1:
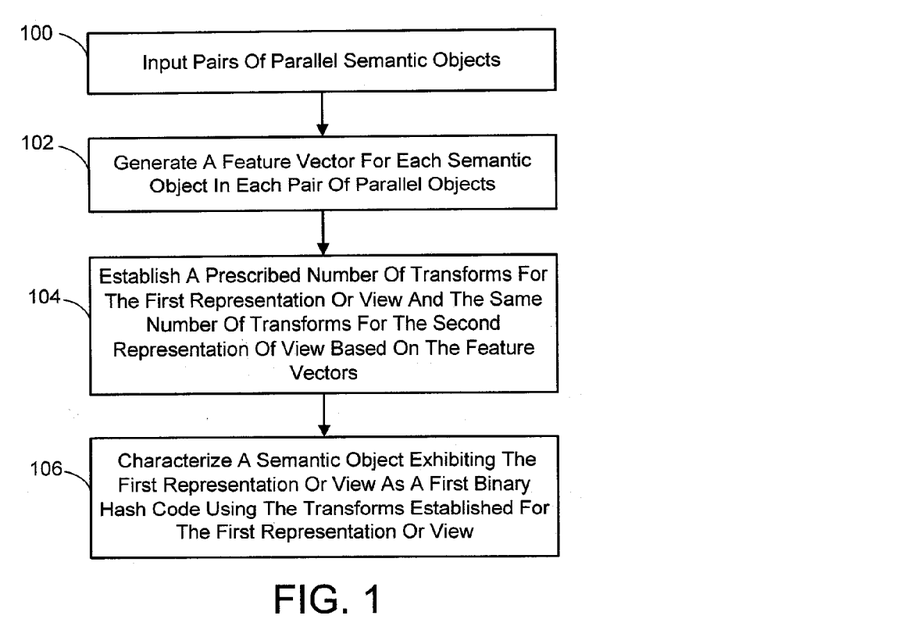
FIG. 1 is a flow diagram generally outlining one embodiment of a process for semantic object characterization.

Referring to FIG. 1, one embodiment of this semantic object characterization involves first inputting pairs of parallel semantic objects (100). A pair of parallel semantic objects is defined as the same semantic object presented in the first and second representations or views. For example, if the semantic objects correspond to peoples' names then a pair of parallel names can be the same name presented in two different languages. Further, if a language employs a script associated with that language, a person's name in that language can be presented in its associated script. It is noted that the number of parallel pairs employed will depend on the type of semantic object involved. In the case of peoples' names, it has been found that 10-15 thousand pairs is an appropriate number of pairs.

Each semantic object in each pair of parallel objects is next subjected to feature extraction to produce a feature vector representing the semantic object (102). This feature extraction will be described in more detail in a subsequent section of this description. A correlation and optimization method is then employed to establish a prescribed number of transforms for the first representation or view and the same number of transforms for the second representation of view based on the feature vectors representing the parallel semantic object pairs (104). This procedure will also be described in more detail in section to follow. However, in general, the transforms established for one of the first or second representations or views, when applied to a feature vector representing a semantic object exhibiting that representation or view, produces the first binary hash code representing that semantic object which is substantially similar to the second binary hash code representing that semantic object produced when the transforms established for the other of the first or second representations or views are applied to a feature vector representing the same semantic object exhibiting that other representation or view. It is noted that in one implementation Canonical Correlation Analysis is employed as the correlation method.

Figure 2:
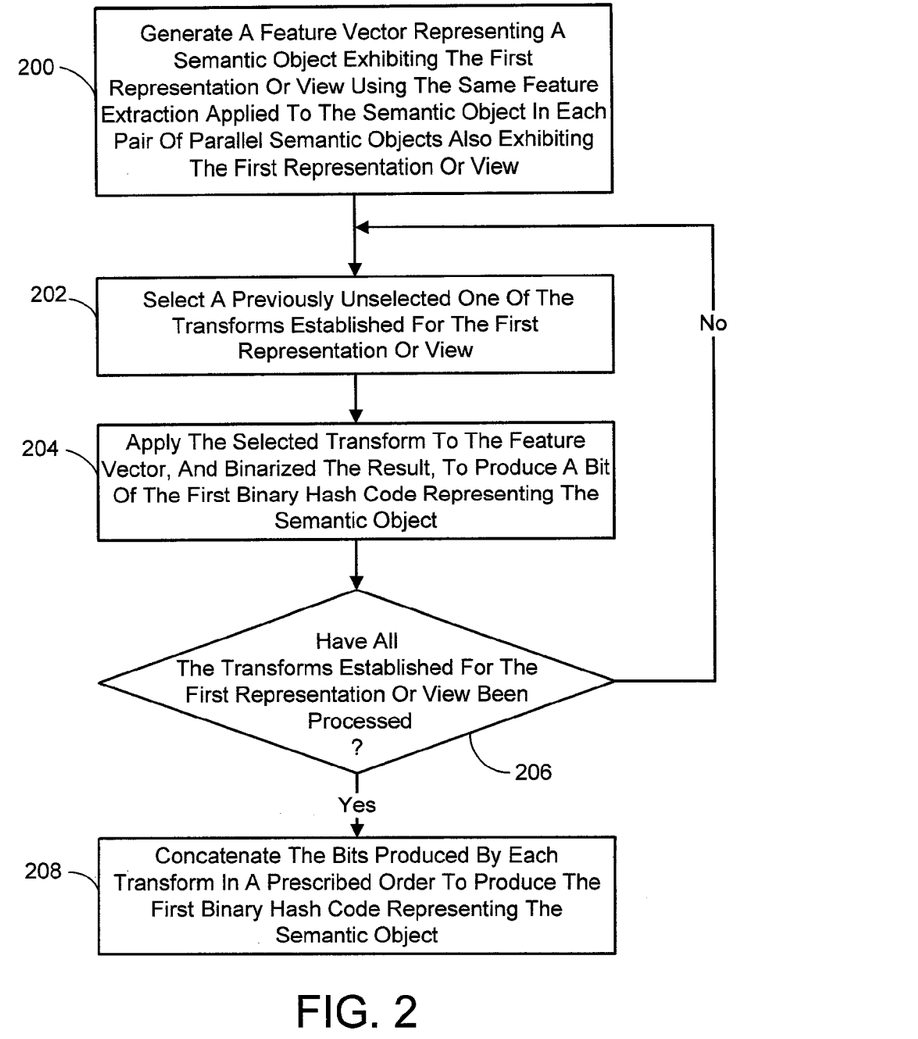
FIG. 2 is a flow diagram generally outlining one implementation of a part of the process of FIG. 1 involving using the transforms established for the first representation or view to characterize a semantic object exhibiting the first representation or view as a first binary hash code.

The transforms established for the first representation or view are next used to characterize a semantic object exhibiting the first representation or view as a first binary hash code representing that semantic object (106). Referring to FIG. 2, in one implementation this last action involves first subjecting the semantic object to the same feature extraction applied to the semantic object in each pair of parallel semantic objects that exhibited the first representation or view, to produce a feature vector representing the semantic object (200). A previously unselected one of the transforms established for the first representation or view is then selected (202). The selected transform is applied to the feature vector representing the semantic object, and the result is binarized, to produce a bit of the first binary hash code representing the semantic object (204). It is then determined if all the transforms established for the first representation or view have been selected and processed (206). If not, then actions (202) through (206) are repeated. When all the transforms have been selected and processed, the bits produced by each transform are concatenated in a prescribed order to produce the first binary hash code representing the semantic object (208).

As indicated above, the semantic object characterization can involve the semantic objects being peoples' names and the representations or views being two different languages (and possibly two different script types). Such an implementation has significant advantages. For example, in the context of using the characterizations to index and search a database directory, assume the database directory is in English, but that a user wants to search the database using a search query in a non-English language that might even employ a different script. When the semantic object characterization is applied to such cross-language searching, it allows the names in the database directory in a first language to be characterized using a language and script independent representation of the name. Then a search query in a second language and possible different script can be characterized in the same language and script independent manner. As such the user can submit a query in the second language and get matching results in the language of the database. Thus, any unfamiliarity with the database language or difference in the phonics between the two languages is by-passed.

One implementation of semantic object characterization where the semantic objects are peoples' names and the representations or views are two different languages (and possibly two different script types) will now be described. In general, this implementation characterizes a person's name in a first language in the form of a first binary hash code representing that name such that when compared to a characterized version of the same name in a second language in the form of a second binary hash code representing that name, the first and second binary hash codes exhibit a degree of similarity indicative of the names being the same name.

Figure 3:
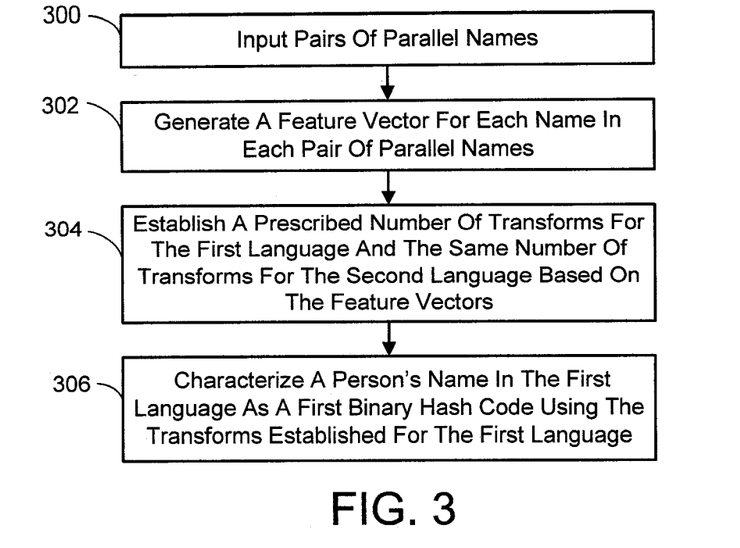
FIG. 3 is a flow diagram generally outlining one embodiment of a process for characterizing peoples' names.

More particularly, referring to FIG. 3, this implementation involves first inputting pairs of parallel names (300), where a pair of parallel names is defined as the same name presented in the first and second languages (and possible different scripts). Each name in each pair of parallel names is next subjected to feature extraction to produce a feature vector representing the name (302). The aforementioned correlation and optimization method is then employed to establish a prescribed number of transforms for the first language and the same number of transforms for the second language based on the feature vectors representing the parallel name pairs (304). The transforms established for one of the languages, when applied to a feature vector representing a name in that language, produces the first binary hash code representing that name which is substantially similar to the second binary hash code representing that name produced when the transforms established for the other language are applied to a feature vector representing the same name in that other language.

Figure 4:
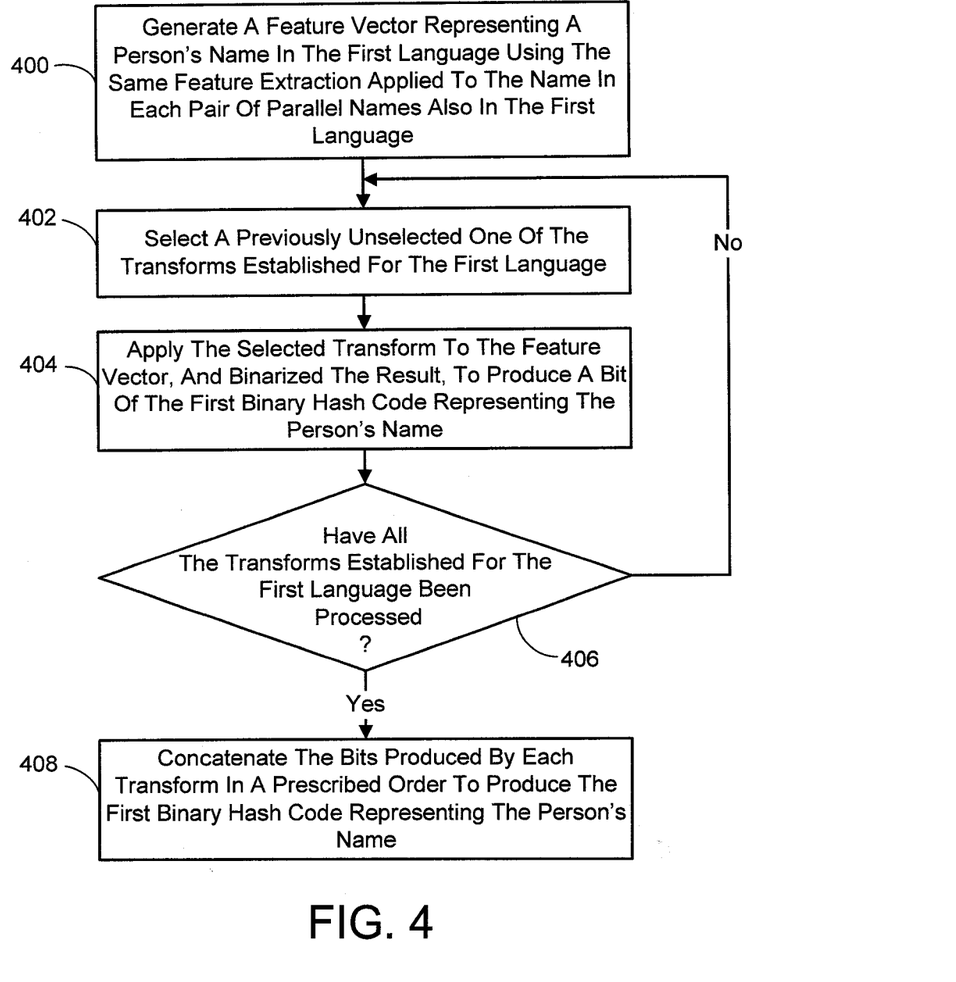
FIG. 4 is a flow diagram generally outlining one implementation of a part of the process of FIG. 3 involving using the transforms established for a first language to characterize a person's name in that first language as a first binary hash code.

The transforms established for the first language are next used to characterize a name in the first language as a first binary hash code representing that name (306). Referring now to FIG. 4, in one implementation this last action involves first subjecting the name to the same feature extraction applied to the name in each pair of parallel names in the first language to produce a feature vector representing the name (400). A previously unselected one of the transforms established for the first representation or view is then selected (402). The selected transform is applied to the feature vector representing the person's name, and the result is binarized, to produce a bit of the first binary hash code representing the name (404). It is then determined if all the transforms established for the first language have been selected and processed (406). If not, then actions (402) through (406) are repeated. When all the transforms have been selected and processed, the bits produced by each transform are concatenating in a prescribed order to produce the first binary hash code representing the person's name (408).

Aspects of the foregoing semantic object characterization and search will now be described in more detail in the following sections.

1.1 Feature Vectors

Rather than using the two representations/views of the same semantic object directly, a feature representation is employed that is independent with regard to format, language, script, and so on. To obtain such an independent representation, a feature vector is formed for each view of each object. Any featurizing method that is appropriate for the objects can be employed to generate the feature vectors. For example, in the case of peoples' names, character n-grams can be extracted as the features and binarized to form a binary feature vector. It is noted that this is not the only possible featurizing method available. For instance, it is also possible to use syllables extracted from the names as features, and the feature vector could be made up of real value numbers rather than being binarized. It is also possible to find a low-dimensional representation by using Principal Components Analysis or any other dimensionality reduction technique on the feature vectors.

As an illustrative example where the objects are peoples' names and the two representations or views are the names in two different languages and possibly two different scripts, a feature vector is generated for each name in each language. For instance, consider an implementation where for each language, bigrams are extracted from the peoples' names to form binary feature vectors. More particularly, consider the names Rashid in Latin script and ರಶೀದ್ in Kannada script (which are the same name in English and Kannada). The following exemplary character bigrams can be extracted from the English-language name Rashid: {^R; Ra; as; sh; hi; id; d$}; and the following exemplary character bigrams can be extracted from the Kannada-language name ರಶೀದ್ : {^ರ ; ರಶ; ಶ ೀ, ೀ ದ ; ದ ್; ್ $}. In this example, similar character bigrams would be extracted from other parallel English-Kannada name pairs to obtain a set of English-language character bigrams and a separate set of Kannada-language character bigrams. For each language separately, the bigrams extracted for that language are ordered in any sequence desired—although once ordered the sequence stays the same for the formation of each feature vector. Character bigram feature vectors are then formed for each English name using the English-language bigram sequence, and character bigram feature vectors are then formed for each Kannada name using the Kannada-language bigram sequence. To this end, for each name being featurized, a value is assigned to each bigram in the sequence to generate the feature vector. For example, a first binary value (e.g., 1) can be assigned to each bigram that appears in the name and the other binary value (e.g., 0) can be assigned to each bigram not appearing in the name.

Figure 5:
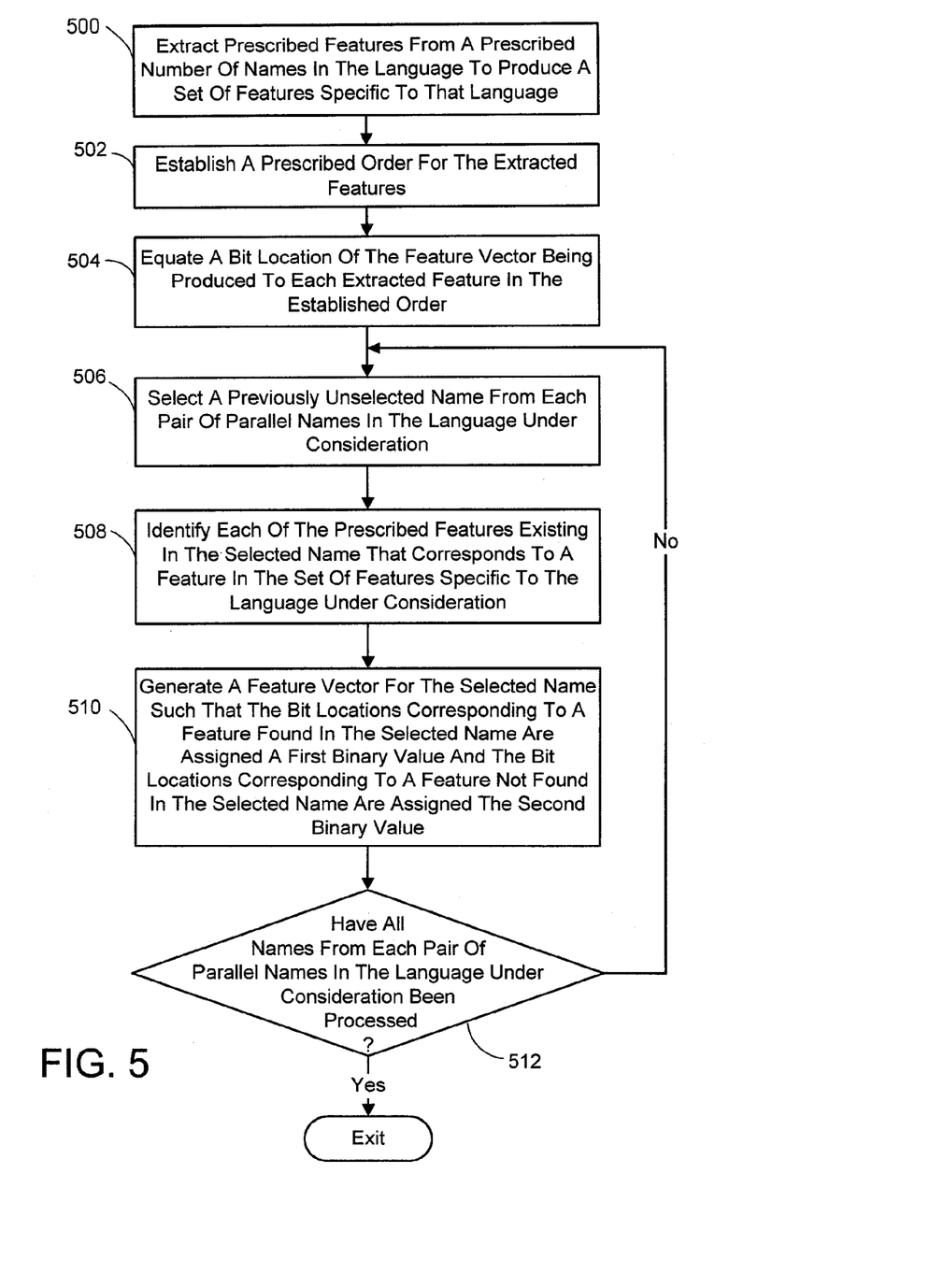
FIG. 5 is a flow diagram generally outlining one implementation of a part of the process of FIG. 3 involving subjecting each name in each pair of parallel names to feature extraction to produce a binary feature vector representing the name for each language respectively.

More particularly, referring to FIG. 5, subjecting each name in each pair of parallel names to feature extraction to produce a binary feature vectors representing the name, includes, for each language respectively, first extracting prescribed features from a prescribed number of names in the language to produce a set of features specific to that language (500). A prescribed order is then established for the extracted features (502). Next, a bit location of the feature vector being produced is equated to each extracted feature in the established order (504). A previously unselected name from each pair of parallel names in the language under consideration is selected (506), and each of the prescribed features existing in the selected name that corresponds to a feature in the set of features specific to the language under consideration is identified (508). A feature vector for the selected name is then generated such that the bit locations corresponding to a feature found in the selected name are assigned a first binary value and the bit locations corresponding to a feature not found in the selected name are assigned the second binary value (510). It is next determined if the names from each pair of parallel names in the language under consideration have been selected and processed (512). If not, actions (506) through (512) are repeated. Otherwise the procedure ends for the language under consideration and the names in the other language are processed.

1.2 Learning Hash Functions

Once feature vectors have been formed for a group of parallel representations or views, a hash function is computed for each semantic object. In the example where the group of parallel views is a group of parallel names in two languages, say English and Kannada, in one embodiment the hash function for English takes as input a name in English and produces a K-bit binary code where K>0. Similarly, the hash function for Kannada takes as input a name in Kannada and produces a K-bit binary code where K>0. It is desired that the hash functions be such that the binary codes produced for similar names be similar, independent of the language or script. Thus, the names 'Rashid' and ರಶೀದ್ , which are the same name in English and Kannada respectively, would be mapped by the two hash functions to a similar binary code, whereas Rashid and ಅಲ್ಬರ್ಟ್ which are dissimilar names, would be mapped by the two hash functions to the dissimilar binary codes.

In one implementation, the K-bit hash functions, for example g for a first representation or view of a semantic object and h for a second representation or view of the semantic object, are composed of K 1-bit hash functions, as follows:

$$g(\bullet)=(g_1(\bullet),\ldots,g_K(\bullet))^T \quad (1)$$

$$h(\bullet)=(h_1(\bullet),\ldots,h_K(\bullet))^T \quad (2)$$

As will be described later, each 1-bit hash function is designed to take a semantic object as input and hashes it to either +1 or −1 (or equivalently to 1 or 0). Hashing the object with each of the K 1-bit hash functions and concatenating the bits together, produces a K bit binary code representing the object. Representing a semantic object as a binary code has many advantages including being able to use a conventional Hamming distance computation to determine the degree of similarity between two of the binary representations. As will be described in more detail later this makes searching faster and more efficient, especially where large databases are involved.

The challenge is to find the hash functions g and h that minimize the Hamming distance between the parallel objects (e.g., names) in the training data. More particularly, the task is to learn the aforementioned K 1-bit hash functions from training data made up of parallel objects. This task can be posed as the following optimization problem:

$$\text{minimize:} \Sigma_{i=1}^{N} \|g(x_i)-h(y_i)\|^2 \quad (3)$$

which in a computationally simplified maximizing formulation is, $$\text{maximize:} \Sigma_{i=1}^{N} g(x_i)^T h(y_i) \quad (4)$$

where N refers to the number of parallel object pairs, $x_i$ is the feature vector for the first view of the parallel object under consideration (e.g., the English-language version of a person's name), and $y_i$ is the feature vector for the other view of the parallel object under consideration (e.g., the Kannada-language version of the person's name).

Additionally, it is desired that the hash functions to have some advantageous properties which are encoded as constraints. First of all, the hash functions could produce centered results in that around 50% of the bits produced in the resulting binary hash code would be +1 and the remaining −1. As such, $$1/N \sum_{i=1}^{N} g(x_i) = \vec{0} \text{ and} \quad (5)$$

$$1/N \sum_{i=1}^{N} h(y_i) = \vec{0}. \quad (6)$$

Further, it is advantageous for the bits produced in the resulting binary hash code to be uncorrelated. Thus, $$1/N \sum_{i=1}^{N} g(x_i) g(x_i)^T = I \text{ and} \quad (7)$$

$$1/N \sum_{i=1}^{N} h(y_i) h(y_i)^T = I \quad (8)$$

where $g(x_i) \in \{\pm 1\}^K$ and $h(y_i) \in \{\pm 1\}^K$.

To make it computationally easier obtain the 1-bit hash functions, linear relaxation is employed, such that:

$$g(x_i) = A^T x_i \text{ and} \quad (9)$$

$$h(y_i) = B^T y_i \quad (10)$$

where A and B represent the transforms.

Thus, in final form the optimization problem can be formulated as:

$$\text{maximize:trace}(A^T XY^T B), \quad (11)$$

This is still subject to the foregoing centered constraint and the uncorrelated bit constraint which is can now be formulated as:

$$A^T XX^T A = I \text{ and} \quad (12)$$

$$B^T YY^T B = I \quad (13)$$

The transforms A and B are such that similar objects (e.g., peoples' names) in the two different representations or views (e.g., two different languages) are mapped to similar binary hash codes by the K-bit hash functions. It is possible to learn such transformations using the aforementioned parallel object training set and a correlation method.

In one embodiment, by viewing each parallel object pair of a group of feature vectors as two representations or views of the same semantic object, it is possible to employ Canonical Correlation Analysis (CCA) to find the transformations A and B. More particularly, given a sample of multivariate data with two views, CCA finds a linear transformation for each view such that the correlation between the projections of the two views is maximized. Consider a sample $Z = \{(x_i, y_i)\}_{i=1}^{N}$ of multivariate data where $x_i \in \mathbb{R}^m$ and $y_i \in \mathbb{R}^n$ are two views of the object. Let $X = \{x_i\}_{i=1}^{N}$ and $Y = \{y_i\}_{i=1}^{N}$. Assume that X and Y are centered, i.e., they have zero mean. Let a and b be two directions. Then, X can be projected onto the direction a to get $U = \{u_i\}_{i=1}^{N}$ where $u_i = a^T x_i$. Similarly, Y can be projected onto the direction b to get the projections $V = \{v_i\}_{i=1}^{N}$ where $v_i = b^T y_i$. The aim of CCA is to find a pair of directions (a; b) such that the projections U and V are maximally correlated.

This is achieved by solving the following optimization problem:

$$\rho = \max_{(a,b)} \frac{\langle X_a, Y_b \rangle}{\|X_a\| \|Y_b\|} = \max_{(a,b)} \frac{a^T XY^T b}{\sqrt{a^T XX^T a} \sqrt{b^T YY^T b}} \quad (14)$$

The foregoing objective function of Eq. 11 can be maximized by solving the following generalized eigenvalue problem:

$$XY^T (YY^T)^{-1} YX^T a = \lambda^2 XX^T a \quad (15)$$

$$(YY^T)^{-1} YX^T a = \lambda b \quad (16)$$

The subsequent basis vectors can be found by adding an orthogonality of bases constraint to the objective function. Although the number of basis vectors can be as high as $\min\{\text{Rank}(X), \text{Rank}(Y)\}$, in practice, a smaller number of the first-generated basis vectors (referred to as the "top" basis vectors) are used since the correlation of the projections is high for these vectors and less for the remaining vectors. In addition, of the top basis vectors, it is desired to employ those that sequentially maximize Eq. (12) and conform to the aforementioned centered and uncorrelated bit constraints. To this end, let A and B be the first K>0 (e.g., 32) basis vectors computed by CCA. Thus, A and B can be expressed as:

$$A = (a_1, \ldots, a_K) \text{ and} \quad (17)$$

$$B = (b_1, \ldots, b_K), \quad (18)$$

where $a_i$ and $b_i$, $i=1, \ldots, K$ are the individual transforms (i.e., basis vectors).

Figure 6:
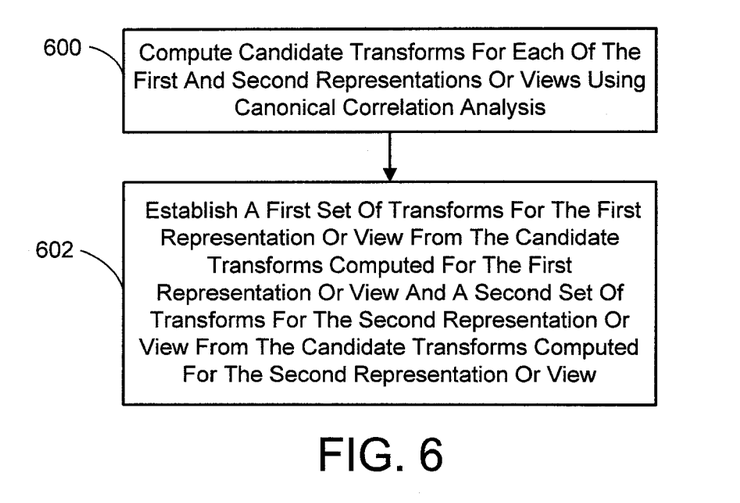
FIG. 6 is a flow diagram generally outlining one implementation of a part of the process of FIG. 1 involving establishing a prescribed number of transforms for the first representation or view and the same number of transforms for the second representation or view based on the feature vectors representing the parallel semantic object pairs.

In view of the foregoing, referring to FIG. 6, in one implementation, establishing a prescribed number of transforms for the first representation or view and the same number of transforms for the second representation or view based on the feature vectors representing the parallel semantic object pairs involves first computing candidate transforms for each of the first and second representations or views using CCA (600). A first set of transforms for the first representation or view is then established from the candidate transforms computed for the first representation or view and a second set of transforms for the second representation or view are established from the candidate transforms computed for the second representation or view (602). The established transforms are such that, when, for each of the parallel pairs of semantic objects, the first set of transforms is applied to the feature vector representing the semantic object of the parallel pair of semantic objects exhibiting the first representation or view and the second set of transforms is applied to the feature vector representing the semantic object of the parallel pair of semantic objects exhibiting the second representation or view, a combined Hamming distance between the resulting first and second binary hash codes produced for all the parallel pairs of semantic objects is minimized. In addition, the first set of transforms are established so as to exhibit a constraint that substantially half of the bits of the first binary hash code produced exhibit a first binary value and the remaining bits exhibit the other binary value. Likewise, the second set of transforms are established so as to exhibit a constraint that substantially half of the bits of the second binary hash code produced exhibit a first binary value and the remaining bits exhibit the other binary value. Still further, the first set of transforms are established so as to exhibit a constraint that the bits of the first binary hash codes produced are uncorrelated, and the second set of transforms are established so as to exhibit a constraint that the bits of the second binary hash codes produced are uncorrelated.

1.3 Generating Binary Hash Codes

The transforms A and B computed from the parallel object training pairs are employed as the 1-bit hash functions to produce a binary hash code from a feature vector representing a semantic object (e.g., a person's name) associated with the representation/view (e.g., language) used to produce the transforms. Thus, in the foregoing example, A can be used to produce a binary hash code from a feature vector representing a person's English-language name, and B can be used to produce a binary hash code from a feature vector representing a person's Kannada-language name.

More particularly, in one embodiment, the transforms are employed to produce a binary hash code from a feature vector representing a particular representation/view of a semantic object by applying the 1-bit hash functions associated with that representation/view (e.g., $a_i$ where $i=1, \ldots, K$). For each 1-bit hash function applied, the initial result will be a positive or negative number (owing to the centered constraint). This initial result is then binarized by applying a sign function which assigns a first binary value to positive numbers and the other binary value to negative numbers. Thus, for example, a binary value of +1 or 1 could be assigned to positive numbers and a binary value of −1 or 0 could be assigned to negative numbers. The resulting final binary value generated by each 1-bit hash function is concatenated in a prescribed order with the others to produce the final binary hash code representing the semantic object under consideration. It is noted that the aforementioned prescribed order is arbitrary, as long as it does not change once established.

In the example where the objects are peoples' names and the two representation/views are English and Kannada versions of the names, the foregoing generation of a binary hash code for a particular name such as Rashid in English and ರಶೀದ್ in Kannada can be accomplished as follows:

$$g(\text{Rashid}) = (g_1(\text{Rashid}), \ldots, g_K(\text{Rashid}))^T \quad (19)$$

where $$g_i(\text{Rashid}) = sgn(a_i^T \phi(\text{Rashid})) \text{ for } i=1, \ldots, K \text{ and} \quad (20)$$

$$h(ರಶೀದ್) = (h_1(ರಶೀದ್), \ldots, h_K(ರಶೀದ್))^T \quad (21)$$

where $$h_i(ರಶೀದ್) = sgn(b_i^T \psi(ರಶೀದ್)) \text{ for } i=1, \ldots, K \quad (22)$$

In Eqs. (19)-(22), $\phi(\text{Rashid})$ refers to the feature vector generated for the English-language name Rashid, $\psi(ರಶೀದ್)$ refers to the feature vector generated for the Kannada-language name ರಶೀದ್, and $$sgn(j) = \begin{cases} +1 & \text{if } j > 0 \\ -1 & \text{if } j < 0. \end{cases} \quad (23)$$

It is noted that the binarizing sgn function could instead produce a 0 bit value instead of a −1 value when j<0, if desired.

2.0 Indexing and Searching a Directory

Each binary hash code produced in the manner described above can be added to a database directory of semantic objects (e.g., peoples' names) in the representation or view (e.g., language) associated with the transforms used to produce the hash codes. This creates a searchable database where items in the database are semantic objects exhibiting a first representation or view, and where a semantic object exhibiting a second representation or view, when presented as a search query to the searchable database, results in an output including the identity of any semantic objects from the database that corresponds to the semantic object of the search query.

The foregoing can be accomplished by first indexing the directory of the database. In general, given a semantic object directory (e.g., a directory of peoples' names), in one embodiment it can be indexed as follows. First, for each object listed in the directory, its feature vector is formed as described previously. The K-bit hash function developed for the directory's particular representation/view (e.g., English) of two companion representations/views (e.g., English-Kannada) is then used to compute the K-bit binary code for each object. This hash function has a companion function used to compute a binary code for the other representation/view (e.g., Kannada). Each object listings is then inserted into a hash table with its binary code associated to it as a key.

Figure 7:
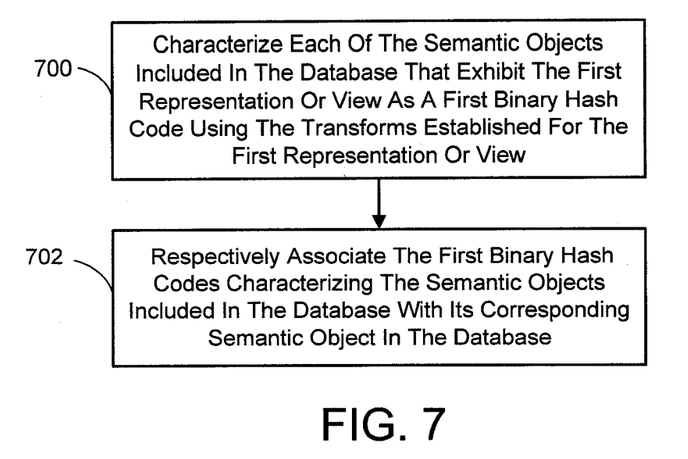
FIG. 7 is a flow diagram generally outlining one embodiment of a process for indexing the directory of a database.
Figure 8:
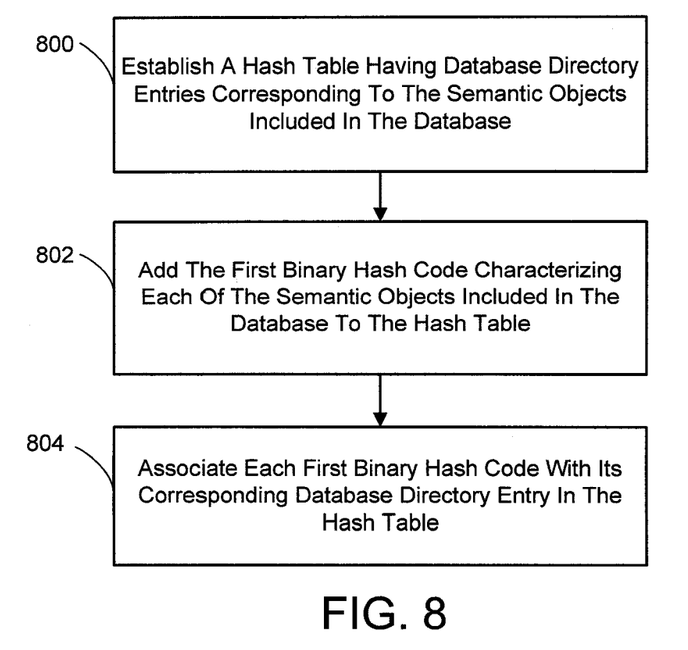
FIG. 8 is a flow diagram generally outlining one implementation of a part of the process of FIG. 7 involving associating the first binary hash codes characterizing the semantic objects included in the database with their corresponding semantic objects in the database.

More particularly, referring to FIG. 7, the transforms established for the first representation or view are used to characterize the semantic objects included in the database that exhibit the first representation or view in the form of the first binary hash code representing that semantic object (700). It is noted that one implementation of this procedure is outlined in FIG. 2 and its accompanying description. Next, the first binary hash codes characterizing the semantic objects included in the database are respectively associated with its corresponding semantic object in the database (702). Referring to FIG. 8, in one implementation this last action involves first establishing a hash table having database directory entries corresponding to the semantic objects included in the database (800). The first binary hash code characterizing each of the semantic objects included in the database are then added to the hash table (802), and each is associated with its corresponding database directory entry in the hash table (804).

Once the semantic object listings in the directory have been indexed as described above, the directory can be searched using a query. This query can be in either of the representations/views (e.g., English or Kannada). More particularly, the query is input and a feature vector is first generated from the query using the procedure appropriate for the query's representation/view. A K-bit binary code is then computed from the query's feature vector using the appropriated K-bit hash function for the representation/view of the query. Next, the degree of similarity of the query's K-bit binary code to each of the keys in the hash table is computed. It is noted that in the foregoing example where the query is in the same representation or view (e.g., English) associated with the K-bit hash function used to index the directory, this amounts to a monolingual search and is useful for spelling correction purposes.

Figure 9:
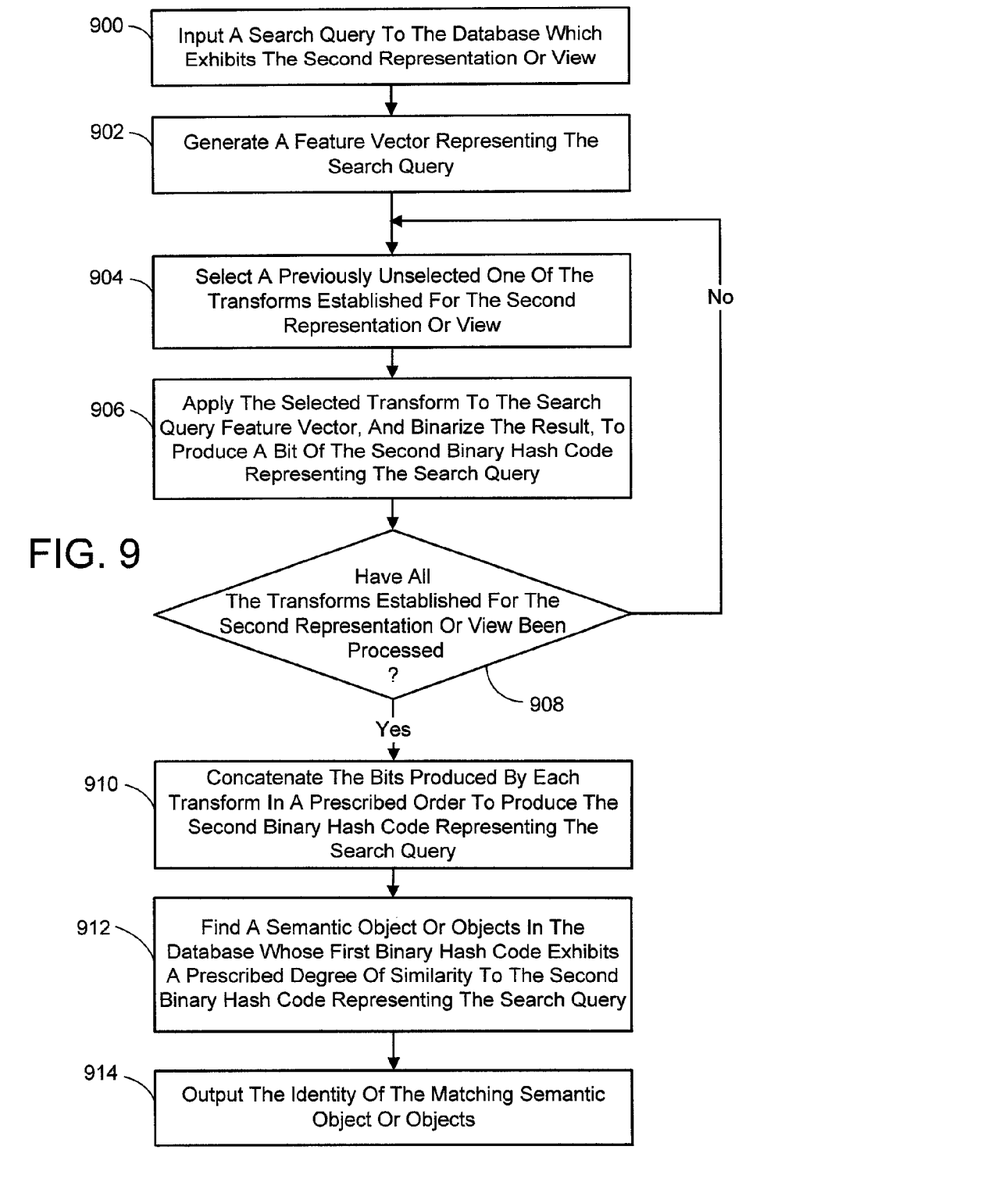
FIG. 9 is a flow diagram generally outlining one embodiment of a process for searching the characterized directory of the database using a characterized search query.

In view of the foregoing, referring to FIG. 9, in one implementation, when a search query is input to the database which exhibits the aforementioned second representation or view (900), a feature vector representing the search query is generated (902). Then, a previously unselected one of the transforms established for the second representation or view is selected (904). The selected transform is applied to the search query feature vector, and the result binarized, to produce a bit of the second binary hash code representing the search query (906). It is next determined if all the transforms have been selected (908). If not, actions (904) through (908) are repeated. When all the transforms have been selected and applied, the bits produced by the transforms are concatenating in a prescribed order to produce the second binary hash code representing the search query (910). Next, a semantic object or objects included in the database whose first binary hash code exhibits a prescribed degree of similarity to the second binary hash code representing the search query are found (912). The identity of the matching semantic object or objects whose first binary hash code is found to exhibit the prescribed degree of similarity to the second binary hash code representing the search query is then output (914).

It is noted that while any appropriate measure of similarity can be employed, in one implementation the Hamming distance is used as the measure. Using the Hamming distance is appropriate as both the query and index keys are binary codes and the Hamming distance can be used to quickly and readily compare two binary codes. There is a considerable advantage to representing the semantic objects in the directory and the query as binary codes and using the Hamming distance as the measure of similarity. Even if there are millions of objects listed in the directory, a brute force comparison can still be employed where the Hamming distance is computed between the query and each of the keys separately, and the entire procedure will take less than a second. Thus, searching the directory is quick, and unless desired otherwise, more sophisticated similarity measures and comparison methods need not be employed. The degree of similarity computed between the query and each of the keys is then used to identify the closest matching key or keys. In one implementation, just the closest matching key is identified (or closest matching keys if there is a tie). However, in an alternate implementation, all the keys whose degree of similarity to the query crosses a similarity threshold are identified. It is noted that in the case of the Hamming distance, all the keys whose distance is equal to or less than a prescribed distance would be identified. The threshold value will depend on the type of semantic objects involved and the precision demanded of the search. In one implementation, the similarity threshold would be set so that the top 5-10 results are identified and output.

3.0 Multiple Part Object Characterization and Search

To this point the semantic object characterization described herein handles the characterization of single-part semantic objects. For example, a single-word name. However, this can be expanded to handle a multiple-part objects, such as multi-word names. A common example would be the first and last name of a person. This would constitute a two-word name. When searching a directory for a person's name, the use of their full name can be advantageous.

In one embodiment, the multiple parts making up an object could be considered a single-part object by combining the parts. For example, a person's first and last name could simply be combined into a single word and characterized in that form. To conduct a search in a directory where multi-part objects have been combined and characterized in single-part form with a multi-part query, the parts of the query are combined before they are characterized and submitted.

However, in an alternate embodiment, each part of a multi-part semantic object is characterized and indexed separated. Then, the individual parts of a multi-part object query are characterized separately and the similarity measures returned for each part are combined to produce an overall similarity measure. In one implementation, this is accomplished by constructing a weighted bipartite graph from the similarity measures returned for each part of a multi-part object query.

Figure 10:
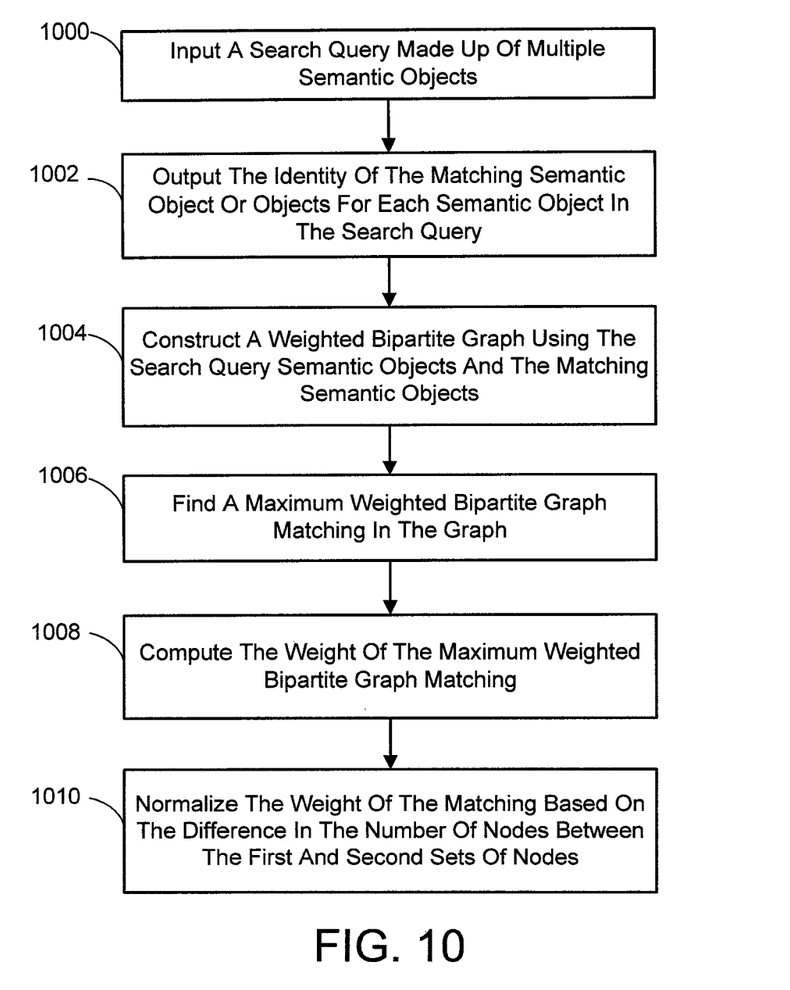
FIG. 10 is a flow diagram generally outlining one embodiment of a process for searching the characterized directory of the database using a characterized multi-part semantic object search query.

Referring to FIG. 10, in one implementation of this latter embodiment, a search query made up of multiple semantic objects is input (1000). The previously-described procedure of FIG. 9 is then performed for each of the search query's multiple semantic objects. Thus, for each semantic object in the search query, the identity of the matching semantic object or objects is the output (1002). Next, a weighted bipartite graph is constructed (1004). In this graph, each of the semantic objects of the search query form a first set of nodes and the identified matching semantic object or objects output for each of the semantic objects of the search query form a second set of nodes. In addition, an edge is assigned between each semantic object associated with the first set of nodes and a semantic object associated with the second set of nodes if the degree of similarity computed between the semantic objects based on their binary hash codes crosses a threshold. The weight of an edge is set equal to the degree of similarity between the nodes it connects. Once the graph is constructed, a maximum weighted bipartite graph matching is found in the graph (1006), and the weight of this matching is computed (1008). The weight of the matching is then normalized based on the difference in the number of nodes between the first and second sets of nodes (1010).

In mathematical terms, using the example of the semantic objects being peoples' names and the two representations or views being different languages, the foregoing can be described as follows. Let $E=e_1, e_2, \ldots, e_I$ be a multi-word English name and $H=h_1, h_2, \ldots, h_J$ be a multi-word Kannada name. A weighted bipartite graph $G=(S \cup T, W)$ with a node $s_i$ for the ith word $e_i$ in E and node $t_j$ for the jth word $h_j$ in H. The weight of the edge $(s_i, t_j)$ is set as $w_{ij}$ which corresponds to the degree of similarity between the nodes $s_i$ and $t_j$ (e.g., based on the Hamming distance between the binary hash codes computed for the nodes).

Let w be the weight of the maximum weighted bipartite matching in the graph G. The similarity between E and H can then be defined as follows:

$$\frac{w}{|I-J|+1} \quad (24)$$

The numerator of the right hand side of Eq. (24) favors name pairs which have a good number of high quality matches at the individual level whereas the denominator penalizes pairs that have disproportionate lengths.

Note that, in practice, both I and J are small and hence the maximum weighted bipartite matching can be found very easily. Further, most edge weights in the bipartite graph are negligibly small. Therefore, even a greedy matching algorithm suffices in practice.

4.0 The Computing Environment

A brief, general description of a suitable computing environment in which portions of the semantic object characterization and search embodiments described herein may be implemented will now be described. The technique embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 11:
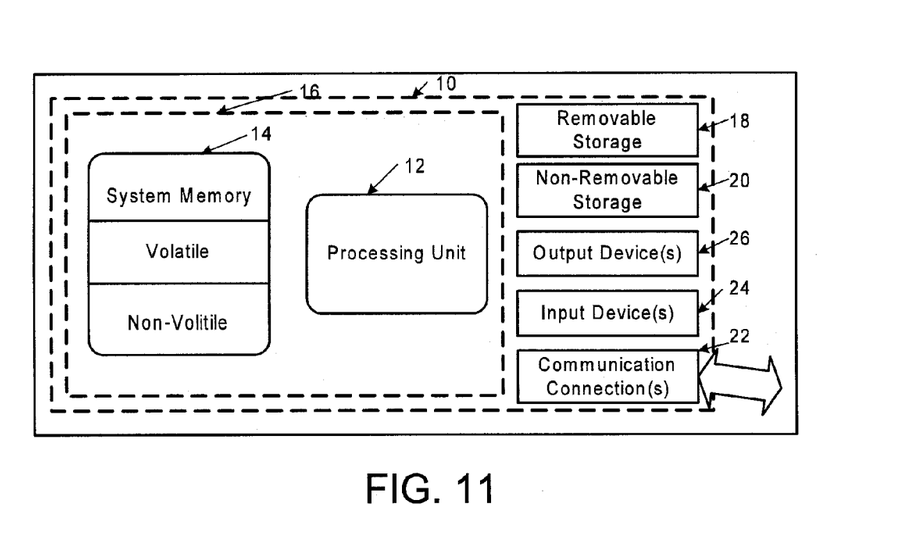
FIG. 11 is a diagram depicting a general purpose computing device constituting an exemplary system for implementing the semantic object characterization and search embodiments described herein.

FIG. 11 illustrates an example of a suitable computing system environment. The computing system environment is only one example of a suitable computing environment and is not intended to suggest any limitation as to the scope of use or functionality of embodiments described herein. Neither should the computing environment be interpreted as having any dependency or requirement relating to any one or combination of components illustrated in the exemplary operating environment. With reference to FIG. 11, an exemplary system for implementing the embodiments described herein includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated in FIG. 11 by dashed line 16. Additionally, device 10 may also have additional features/functionality. For example, device 10 may also include additional storage (removable and/or non-removable) including, but not limited to, magnetic or optical disks or tape. Such additional storage is illustrated in FIG. 11 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Device 10 may also have input device(s) 24 such as keyboard, mouse, pen, voice input device, touch input device, camera, etc. Output device(s) 26 such as a display, speakers, printer, etc. may also be included. All these devices are well known in the art and need not be discussed at length here.

The semantic object characterization and search embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

5.0 Other Embodiments

Some other examples of semantic objects and representations or views, other than the names-languages example described in the foregoing description, include the situation where the semantic object is an entity which is queried by a user and the two representations or views are image features and textual features from a web-page that concerns the entity. Thus, for the same semantic object there are two views which can be used to improve multimodal search operations. Another example is when the semantic object is a document and the two representations or views are the document in a first language and the document in a second language. After learning the hash functions from a set of aligned parallel documents in the two languages, it is possible to do a cross-language search of a document collection in either language using the hash functions. Yet another example is when the semantic object is a word and its two views are the character sequence and the phoneme sequence for the word. After learning the hash functions from a pronunciation dictionary, it is possible to use them for searching the nearest phoneme sequence in the dictionary for an out-of-vocabulary word seen in the text.

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for characterizing a first representation or view of a semantic object in the form of a first binary hash code representing that semantic object such that when compared to a characterized version of a second representation or view of the same semantic object in the form of a second binary hash code representing that semantic object, the first and second binary hash codes exhibit a degree of similarity indicative of the objects being the same object, said process comprising:

using a computer to perform the following process actions:
inputting pairs of parallel semantic objects, wherein a pair of parallel semantic objects comprises the same semantic object presented in the first and second representations or views;
subjecting each semantic object in each pair of parallel semantic objects to feature extraction to produce a feature vector representing the semantic object;
establishing a prescribed number of transforms for the first representation or view and the same number of transforms for the second representation or view based on the feature vectors representing the parallel semantic object pairs, wherein the transforms established for one of the first or second representations or views, when applied to a feature vector representing a semantic object exhibiting that representation or view, produces the first binary hash code representing that semantic object which is substantially similar to the second binary hash code representing that semantic object produced when the transforms established for the other of the first or second representations or views are applied to a feature vector representing the same semantic object exhibiting that other representation or view, and wherein said transforms established for the first representation or view are not all the same as the transforms established for the second representation or view; and
using the transforms established for the first representation or view to characterize a semantic object exhibiting the first representation or view as the first binary hash code representing that semantic object.

2. The process of claim 1, wherein the process action of using the transforms established for the first representation or view to characterize a semantic object exhibiting the first representation or view in the form of the first binary hash code representing that semantic object, comprises the actions of:

subjecting the semantic object to the same feature extraction applied to the semantic object in each pair of parallel semantic objects exhibiting the first representation or view, to produce a feature vector representing the semantic object;

for each of the transforms established for the first representation or view, applying the transform to the feature vector representing the semantic object, and binarizing the result, to produce a bit of the first binary hash code representing the semantic object; and concatenating the bits produced in a prescribed order to produce the first binary hash code representing the semantic object.

3. The process of claim 1, wherein the process action of subjecting each semantic object in each pair of parallel semantic objects to feature extraction to produce a feature vector representing the semantic object, comprises an action of producing one of a binary feature vector or a real valued feature vector.

4. The process of claim 3, wherein the process action of subjecting each semantic object in each pair of parallel semantic objects to feature extraction to produce a feature vector representing the semantic object, comprises an action of producing a lower-dimensional representation using a dimensionality reduction technique.

5. The process of claim 1, wherein the process action of establishing a prescribed number of transforms for the first representation or view and the same number of transforms for the second representation of view based on the feature vectors representing the parallel semantic object pairs, comprises the actions of:

computing candidate transforms for each of the first and second representations or views using Canonical Correlation Analysis;

establishing a first set of transforms for the first representation or view from the candidate transforms computed for the first representation or view and a second set of transforms for the second representation or view from the candidate transforms computed for the second representation or view which, when, for each of the parallel pairs of semantic objects, the first set of transforms is applied to the feature vector representing the semantic object of the parallel pair of semantic objects exhibiting the first representation or view and the second set of transforms is applied to the feature vector representing the semantic object of the parallel pair of semantic objects exhibiting the second representation or view, a combined Hamming distance between the resulting first and second binary hash codes produced for all the parallel pairs of semantic objects is minimized.

6. The process of claim 5, wherein the process action of establishing a prescribed number of transforms for the first representation or view and the same number of transforms for the second representation of view based on the feature vectors representing the parallel semantic object pairs, further comprises the actions of:

establishing the first set of transforms to exhibit a constraint that substantially half of the bits of the first binary hash code produced exhibit a first binary value and the remaining bits exhibit the other binary value; and establishing the second set of transforms to exhibit a constraint that substantially half of the bits of the second binary hash code produced exhibit the first binary value and the remaining bits exhibit the other binary value.

7. The process of claim 6, wherein the process action of establishing a prescribed number of transforms for the first representation or view and the same number of transforms for the second representation of view based on the feature vectors representing the parallel semantic object pairs, further comprises the actions of:

establishing the first set of transforms to exhibit a constraint that the bits of the first binary hash codes produced are uncorrelated; and establishing the second set of transforms to exhibit a constraint that the bits of the second binary hash codes produced are uncorrelated.

8. A computer-implemented process for creating a searchable database wherein items in the database are semantic objects exhibiting a first representation or view, and wherein a semantic object that is the same as a semantic object included in the database, but exhibiting a second representation or view, when presented as a search query to the searchable database results in an output comprising an identity a semantic object exhibiting the first representation or view that corresponds to the semantic object of the search query, said process comprising:

using a computer to perform the following process actions:

establishing a prescribed number of transforms for the first representation or view and the same number of transforms for the second representation of view, wherein the transforms established for one of the first or second representations or views, when applied to a feature vector representing a semantic object exhibiting that representation or view, produces the first binary hash code representing that semantic object which is substantially similar to a second binary hash code representing that semantic object produced when the transforms established for the other of the first or second representations or views are applied to a feature vector representing the same semantic object exhibiting that other representation or view, and wherein said transforms established for the first representation or view are not all the same as the transforms established for the second representation or view; and using the transforms established for the first representation or view to characterize each of the semantic objects included in the database in the form of the first binary hash code representing that semantic object, wherein the first binary code characterizing a semantic object included in the database is substantially different from the first binary codes characterizing the other semantic objects included in the database; and respectively associating the first binary hash code characterizing each of the semantic objects included in the database with its corresponding semantic object in the database.

9. The process of claim 8, further comprising the process action of:

whenever a search query is input to the database which exhibits the second representation or view, generating a feature vector representing the search query;

for each of the transforms established for the second representation or view, applying the transform to the feature vector representing the search query, and binarizing the result, to produce a bit of the second binary hash code representing the search query;

concatenating the bits produced in a prescribed order to produce the second binary hash code representing the search query;

finding a semantic object or objects included in the database whose first binary hash code exhibits a prescribed degree of similarity to the second binary hash code representing the search query; and outputting the identity of a matching semantic object or objects included in the database whose first binary hash code is found to exhibit the prescribed degree of similarity to the second binary hash code representing the search query.

10. The process of claim 9, wherein the process action of finding a semantic object or objects included in the database whose first binary hash code exhibits a prescribed degree of similarity to the second binary hash code representing the search query, comprises the actions of:
respectively computing a Hamming distance value between the second binary hash code representing the search query and the first binary hash code associated with each of the semantic objects included in the database; and
finding the semantic object or objects included in the database whose first binary hash code exhibits a hamming distance between it and the second binary hash code representing the search query that is the smallest.

11. The process of claim 9, wherein the process action of finding a semantic object or objects included in the database whose first binary hash code exhibits a prescribed degree of similarity to the second binary hash code representing the search query, comprises the actions of:
respectively computing a Hamming distance value between the second binary hash code representing the search query and the first binary hash code associated with each of the semantic objects included in the database; and
finding the semantic object or objects included in the database whose first binary hash code exhibits a Hamming distance between it and the second binary hash code representing the search query that falls below a Hamming distance threshold.

12. The process of claim 9, wherein the search query input to the database comprises multiple semantic objects which have been combined into a single semantic object, and wherein at least some of the semantic objects included in the database are multiple semantic objects which have been combined into a single semantic object.

13. The process of claim 9, wherein the search query input to the database comprises multiple semantic objects, and wherein the feature vector generating, transform application and binarization, concatenating, finding and outputting process actions are repeated for each of the multiple semantic objects of the search query, and wherein the process further comprises process action of:
constructing a weighted bipartite graph wherein the each of the semantic objects of the search query form a first set of nodes of the graph and the
identified matching semantic object or objects output for each of the semantic objects of the search query form a second set of nodes of the graph;
respectively computing a degree of similarity between the binary hash code of each of the semantic objects associated with the first set of nodes and the binary hash code of each of the semantic objects associated with the second set of nodes, if not already known;
assigning an edge between each semantic object associated with the first set of nodes and a semantic object associated with the second set of nodes if the degree of similarity between the semantic objects based on their binary hash codes crosses a threshold, wherein the weight of an edge is set equal to the degree of similarity;
finding a maximum weighted bipartite graph matching in the graph;
computing the weight of the matching;
normalizing the weight of the matching based on the difference in the number of nodes between the first and second sets of nodes.

14. The process of claim 8, wherein the process action of respectively associating the first binary hash code characterizing each of the semantic objects included in the database with its corresponding semantic object in the database, comprises the action of:
establishing a hash table comprising database directory entries corresponding to the semantic objects included in the database;
adding the first binary hash code characterizing each of the semantic objects included in the database to the hash table; and
associating the first binary hash code characterizing each of the semantic objects included in the database with its corresponding database directory entry in the hash table.

15. A computer-implemented process for characterizing a person's name in a first language in the form of a first binary hash code representing that name such that when compared to a characterized version of the same name in a second language in the form of a second binary hash code representing that name, the first and second binary hash codes exhibit a degree of similarity indicative of the names being the same name, said process comprising:
using a computer to perform the following process actions:
inputting pairs of parallel names, wherein each pair of parallel names comprises the a person's name presented in the first and second languages, and wherein each pair of parallel names corresponds to a different name;
subjecting each name in each pair of parallel names to feature extraction to produce a binary feature vector representing the name;
establishing a prescribed number of transforms for the first language and the same number of transforms for the second language based on the feature vectors representing the parallel name pairs, wherein the transforms established for one of the first or second languages, when applied to a feature vector representing a name in that language, produces the first binary hash code representing that name which is substantially similar to the second binary hash code representing that name produced when the transforms established for the other of the first or second languages are applied to a feature vector representing the same name in that other language, and wherein said transforms established for the first language are not all the same as the transforms established for the second language; and
using the transforms established for the first language to characterize a person's name in the first language as the first binary hash code representing that name.

16. The process of claim 15, wherein the process action of using the transforms established for the first language to characterize a person's name in the first language as the first binary hash code representing that name, comprises the actions of:
subjecting the person's name to the same feature extraction applied to the name in each pair of parallel names in the first language, to produce a binary feature vector representing the name;
for each of the transforms established for the first language, applying the transform to the feature vector representing the person's name, and binarizing the result, to produce a bit of the first binary hash code representing the name; and concatenating the bits produced in a prescribed order to produce the first binary hash code representing the person's name.

17. The process of claim 16, wherein if the first language employs a script associated with that language, or if the second language employs a script associated with that language, or if both languages employ respective scripts associated with the language, a person's name in a language employing script associated with that language is employed in its associated script.

18. The process of claim 15, wherein the process action of subjecting each name in each pair of parallel names to feature extraction to produce a binary feature vector representing the name, comprises the actions of:

for each of the first and second languages respectively,
    extracting prescribed features from a prescribed number of names in the language under consideration to produce a set of features specific to that language,
    establishing a prescribed order for the extracted features, and
    equating a bit location of each feature vector being produced to each extracted feature in the established order;

for each of the names in each pair of parallel names in the first and second languages respectively,
    identifying each of the prescribed features existing in the name that corresponds to a feature in the set of features specific to the language under consideration,
    generating a feature vector for the name under consideration such that the bit locations corresponding to a feature found in the name are assigned a first binary value and the bit locations corresponding to a feature not found in the name are assigned the second binary value.

19. The process of claim 18, wherein the prescribed features comprise character n-grams.

20. The process of claim 18, wherein the prescribed features comprise syllables.

* * * * *